(12) United States Patent
Iwatsuki

(10) Patent No.: US 6,203,099 B1
(45) Date of Patent: Mar. 20, 2001

(54) AUTOMOBILE BODY FRAME

(75) Inventor: Shuuichiro Iwatsuki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/252,090

(22) Filed: Feb. 18, 1999

(30) Foreign Application Priority Data

Feb. 19, 1998 (JP) .................................................. 10-037200
Nov. 4, 1998 (JP) .................................................. 10-312855

(51) Int. Cl.[7] .................................................. B62D 25/20
(52) U.S. Cl. .................................................. 296/204
(58) Field of Search .................................................. 296/204, 205, 296/188

(56) References Cited

U.S. PATENT DOCUMENTS 2,289,470 * 7/1942 Vincent .................................................. 296/204

FOREIGN PATENT DOCUMENTS

40481372 * 3/1992 (JP) .................................................. 296/204
631925 * 1/1995 (JP) .................................................. 296/204

* cited by examiner

*Primary Examiner*—Dennis H. Pedder
(74) *Attorney, Agent, or Firm*—Arent Fox Kintner Plotkin & Kahn, PLLC

(57) ABSTRACT

In an automobile body frame, a hollow beam formed by extrusion molding from a light metal material is used for linearly coupling the rear end of each front side frame to the side end of a rear cross member. A sheet rail bracket is formed by die casting for coupling the adjoining region of the center-pillar coupling portion of the side sill to the hollow beam.

8 Claims, 7 Drawing Sheets

AUTOMOBILE BODY FRAME

BACKGROUND OF THE INVENTION

1. Field of the Invention

The present invention relates to an automobile body frame which is formed of a light metal such as aluminum alloy.

The present application is based on Japanese Patent Applications No. Hei. 10-37200 and No. Hei. 10-312855, which are incorporated herein by reference.

2. Description of the Related Art

An automobile body frame of a space frame type comprising welded hollow members in structure is generally such that front side frames are extendedly provided on the respective inner sides of front wheels; side sills are extendedly provided on the respective side ends of a passenger room flooring; and the rear sides of the front side frames and the front ends of the side sills are all connected to a dash board lower cross member. According to this type, the coupling ends at which the front side frame and the side sill are coupled to the dash board lower cross member are respectively set in offset positions in the width direction of an automobile. As a result, when the automobile undergoes a head-on collision, an input position where the crashing load applied from the front side frame and an input position where the counterforce load applied from the side sill are input to the dash board lower cross member are shifted from each other. Accordingly, a coupling portion where each front side frame and the dash board lower cross member are coupled together tends to easily bend toward the inside of the passenger room.

It is undesirable to cause the deformation of the automobile body to develop into the passenger room, so the rigidity of the passenger room flooring has been increased by enlarging the sectional areas of the dash board lower cross member and the side sills. However, if the sizes of the dash board lower cross member and the side sill are increased, comfortableness in the passenger room and boarding-alighting ease deteriorate.

Further, there is another problem in the case of a side impact. In order to protect a passenger from the side impact, a center pillar must be restrained from developing into a passenger room. Consequently, the bending rigidity of the coupling portion between the center pillar and a side sill should be increased. Hence, a relatively greater sectional area is normally secured for the side sill, which may result in sacrificing the boarding-alighting ease.

SUMMARY OF THE INVENTION

To solve the above problems, it is an object of the present invention to provide an automobile body frame so designed as to increase rigidity in the longitudinal direction of flooring without incurring the deterioration of not only comfortableness in the passenger room but also boarding-alighting ease.

Further, it is another object of the present invention to provide an automobile body frame so designed as to increase the bending rigidity of the coupling portion between a center pillar and a side sill without incurring an increase of the size of the side sill.

In an automobile body frame according to the present invention, a hollow beam formed by extrusion molding from a light metal material is used for linearly coupling the rear end of each front side frame to the side end of a rear cross member. In consequence, the load applied to the front side frame at the time of a head-on collision is received by the hollow beam extendedly provided in the longitudinal direction of a passenger room portion, so that such deformation of the dash board lower cross member as to develop into the passenger room is avoided. Desired rigidity can be obtained without increasing the thickness of a passenger room flooring by making the hollow beam a quadrilateral having a cross sectional shape whose width is smaller than its height and joining the facing inner surfaces of upper and lower walls of the hollow beam with ribs. Moreover, the rigidity of the joint between the hollow beam and the rear cross member can be increased further by connecting the rear end of the hollow beam and the side end of the rear cross member to an outrigger.

Further, in an automobile body frame according to the present invention, a hollow beam formed by extrusion molding from a light metal material is used for coupling the rear end of each front side frame to the side end of a rear cross member on the inner side of a side sill and that a sheet rail bracket formed by die casting is used for coupling the adjoining region of the center-pillar coupling portion of the side sill to the hollow beam. With this arrangement, the sectional area of the side sill becomes reducible since the load applied to the center pillar is made receivable by the side sill and the hollow beam both. Moreover, no special high-rigid member is required as a coupling member since the side sill and the hollow beam are coupled together by means of the sheet rail bracket.

Features and advantages of the invention will be evident from the following detailed description of the preferred embodiments described in conjunction with the attached drawings.

DETAILED DESCRIPTION OF THE PREFERRED EMBODIMENTS

A detailed description will be given of embodiments of the present invention with reference to the accompanying drawings in detail.

Figure 1:
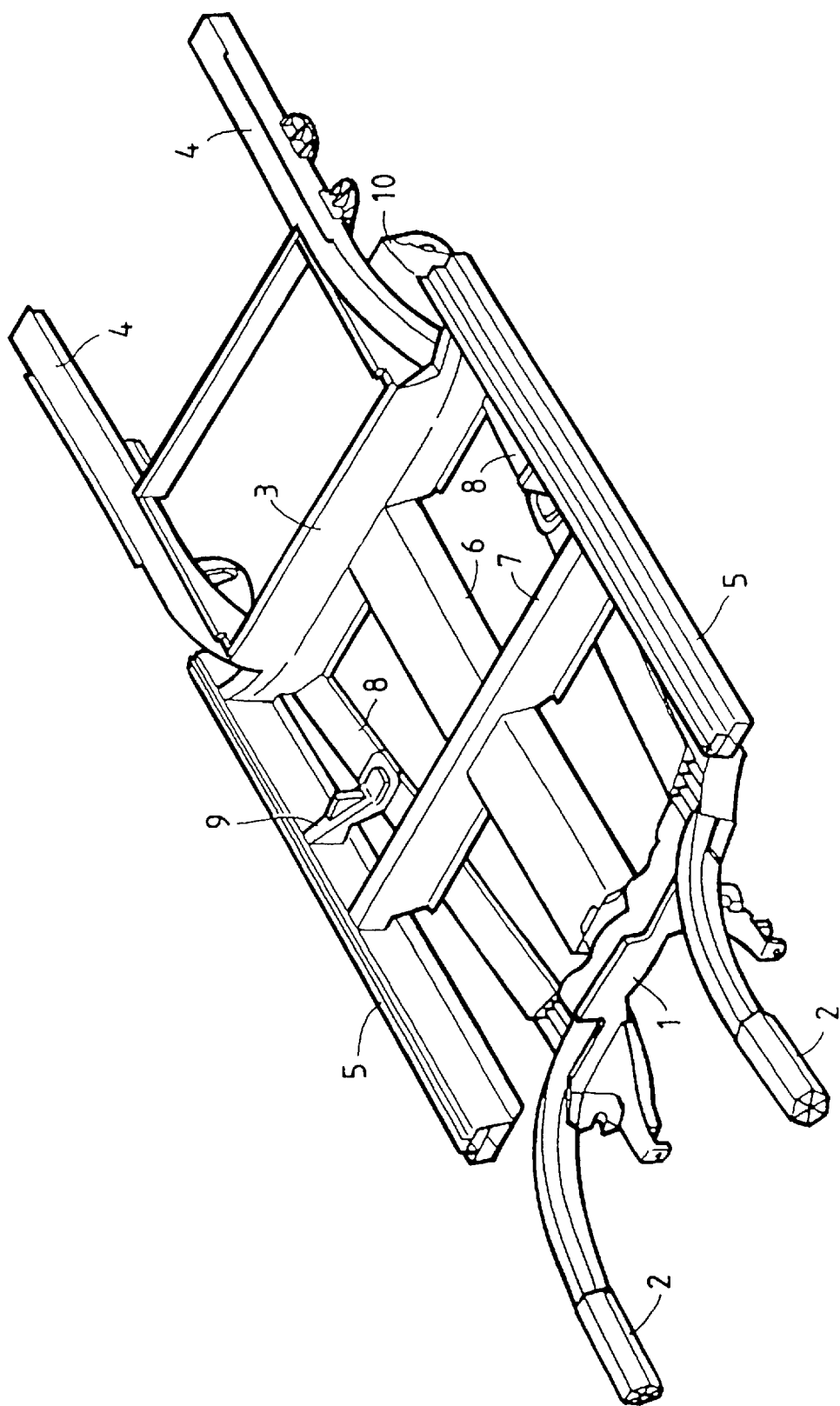
FIG. 1 shows a perspective view of a lower frame in an automobile body according to a first embodiment of the present invention.

FIGS. 1 to 5 show a first embodiment of the present invention. FIG. 1 is a diagram illustrating an overall lower automobile body frame according to the first embodiment of the present invention. The frame is formed by welding together various members made of aluminum alloy, and comprises lateral pair of front side frames 2, a lateral pair of rear side frames 4, a lateral pair of side sills 5, a floor tunnel 6, a middle cross member 7, a pair of floor beams 8 (hollow beams), sheet rail brackets 9, and an outrigger 10.

The lateral pair of front side frames 2 extend forward, and rear ends thereof are joined to a dash board lower cross member 1. The lateral pair of rear side frames 4 extend backward, and front ends thereof are joined to a rear cross member 3. The lateral pair of side sills 5 are extendedly provided in the longitudinal direction so as to couple the respective side ends of the dash board lower cross member 1 and the rear cross members 3. The floor tunnel 6 are extendedly provided in the longitudinal direction so as to couple the central portions of the dash board lower cross member 1 and the rear cross members 3. The middle cross member 7 couples the lateral side sills 5 in the longitudinal intermediate portion of a passenger room. Each of the pair of floor beams 8 (hollow beams) couples the joint of the front side frame 2 to the dash board lower cross member 1 with the side end of the rear cross member 3. The pair of floor beams 8 are disposed so that the distance between two floor beams 8 gradually expands toward the rear side. The sheet rail brackets 9 are provided in the rear of the middle cross member 7 so as to couple the side sills 5 to the respective hollow beams 8. The sheet rail brackets 9 supports the rear ends of sheet rails (not shown). The outrigger 10 is provided in each coupling portion among the rear cross member 3, the rear side frame 4, the side sill 5 and the floor beam 8.

Each of these members is formed of a hollow material prepared by extrusion molding except that the dash board lower cross member 1, the sheet rail brackets 9 and the outriggers 10 are formed by die casting.

Although illustration has been omitted in FIG. 1, flooring which is formed by press-molding an aluminum alloy sheet is put in a passenger room and a trunk room.

Figure 2:
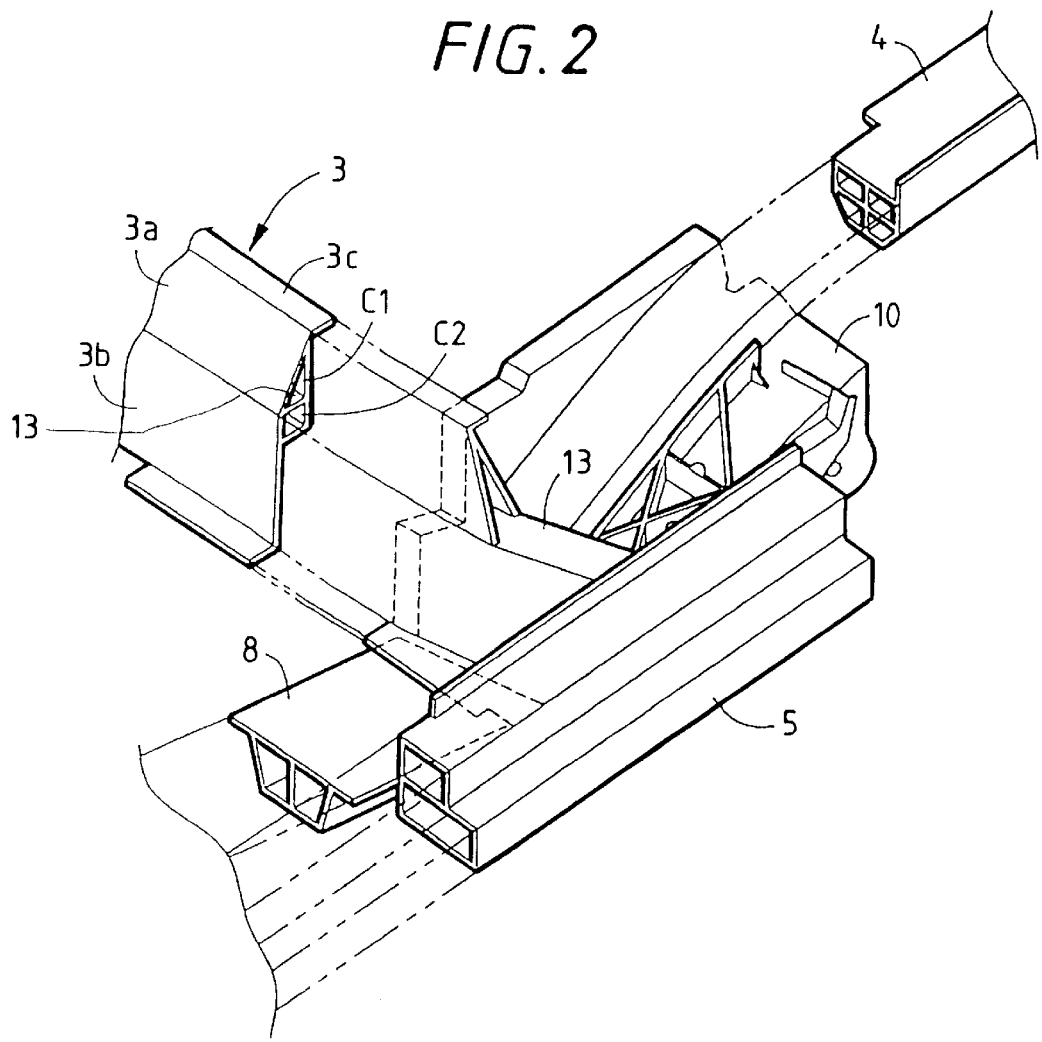
FIG. 2 shows a perspective view of the principal part, showing the connecting condition of each member to an outrigger.

The rear cross member 3 connected to the rear end of the floor tunnel 6 is formed by extrusion molding from aluminum alloy. As shown in FIG. 2, the cross sectional shape of the rear cross member 3 includes a first portion 3a, a second portion 3b, and an eaves-like portion 3c. The first portion 3a is formed by vertically stacking two closed sectional portions C1, C2. The second portion 3b extends downward from the front wall of the first portion 3a with its lower edge portion extended forward like an apron. The eaves-like portion 3c extends backward from the top of the first portion 3a.

Both the side end portions of the rear cross member 3 are curved backward, and a portion above an intermediate partition wall 13 between the two closed sectional portions C1, C2 of the first portion 3a is cut off in the side end portion of the rear cross member 3. Terminals of the lower closed sectional portion C2 and the second portion 3b are welded by fillet welding onto the inner side of the side sill 5. So the lateral side sills 5 are coupled together via the rear cross member 3 whose hollow closed sectional portion C2 is continuous over the whole length in the width direction of an automobile.

Figure 3:
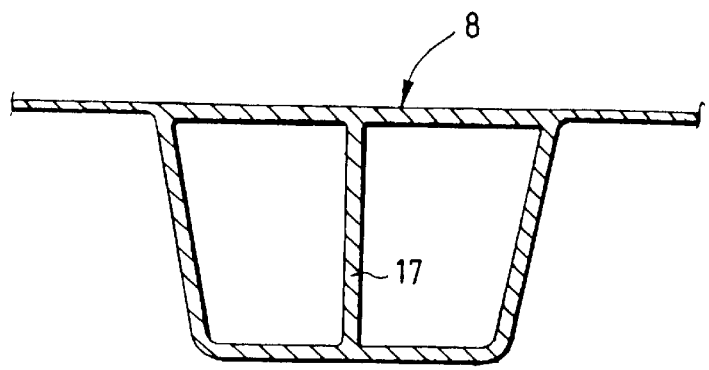
FIG. 3 shows a sectional view of the floor beam.

As shown in FIG. 3, the cross sectional shape of the floor beam 8 is an inverted trapezoid whose height is smaller than its width and whose lower side is narrower than its upper side, and the facing inner surfaces of the upper and lower walls are joined with a vertical rib 17, whereby necessary and sufficient buckling strength can secured without increasing the sectional area.

Figure 4:
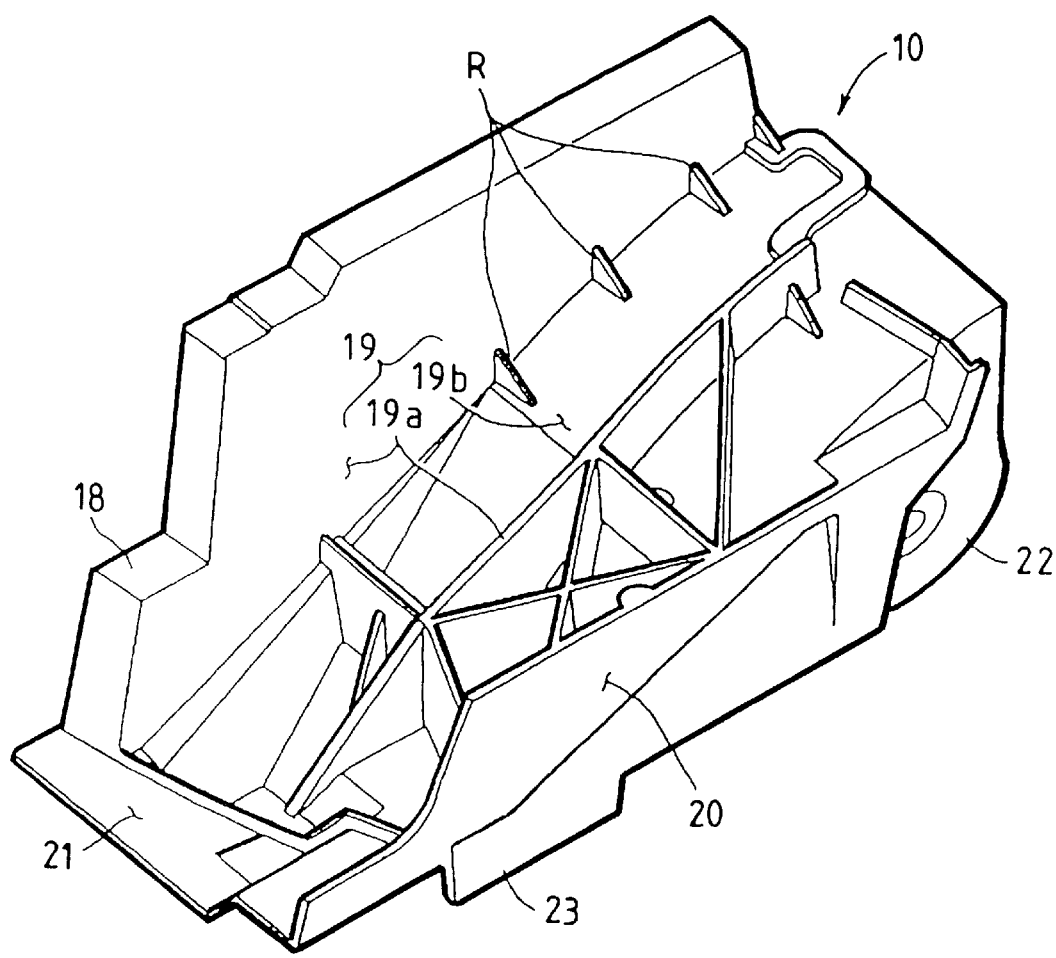
FIG. 4 shows a perspective view of a single body of the outrigger.

The outrigger 10 juxtaposed with the coupling portion where the rear cross member 3, the rear side frame 4, the side sill 5 and the floor beam 8 are coupled together is formed by die casting as previously noted. As shown in FIG. 4, the outrigger 10 comprises the following portions integrally formed with each other: a stepwise rear-cross-member connecting portion 18, a rear-side-frame connecting portion 19, a side-sill connecting portion 20, a floor-beam connecting portion 21, an arm-bracket portion 22, and a side jack-up point 23. Further, the outrigger 10 is properly reinforced with ribs R.

The rear-cross-member connecting portion 18 has a stepwise shape so as to bring into contact with the back and bottom of the first portion 3a in the side end portion of the rear cross member 3 and the back of the second portion 3b. The rear-side-frame connecting portion 19 includes side walls 19a reinforced with triangle ribs R to be joined to the both sides of the front end portion of the rear side frame 4. The rear-side-frame connecting portion 19 further includes a bottom wall 19b in the form of a gentle arc to be joined to the bottom of the front end portion of the rear side frame 4. The side-sill connecting portion 20 is joined to the inside of the rear end portion of the side sill 5 The floor-beam connecting portion 21 is joined to the upper surface of the rear end portion of the floor beam 8. A rear trailing arm is pivotally fitted to the arm-bracket portion 22.

Figure 5:
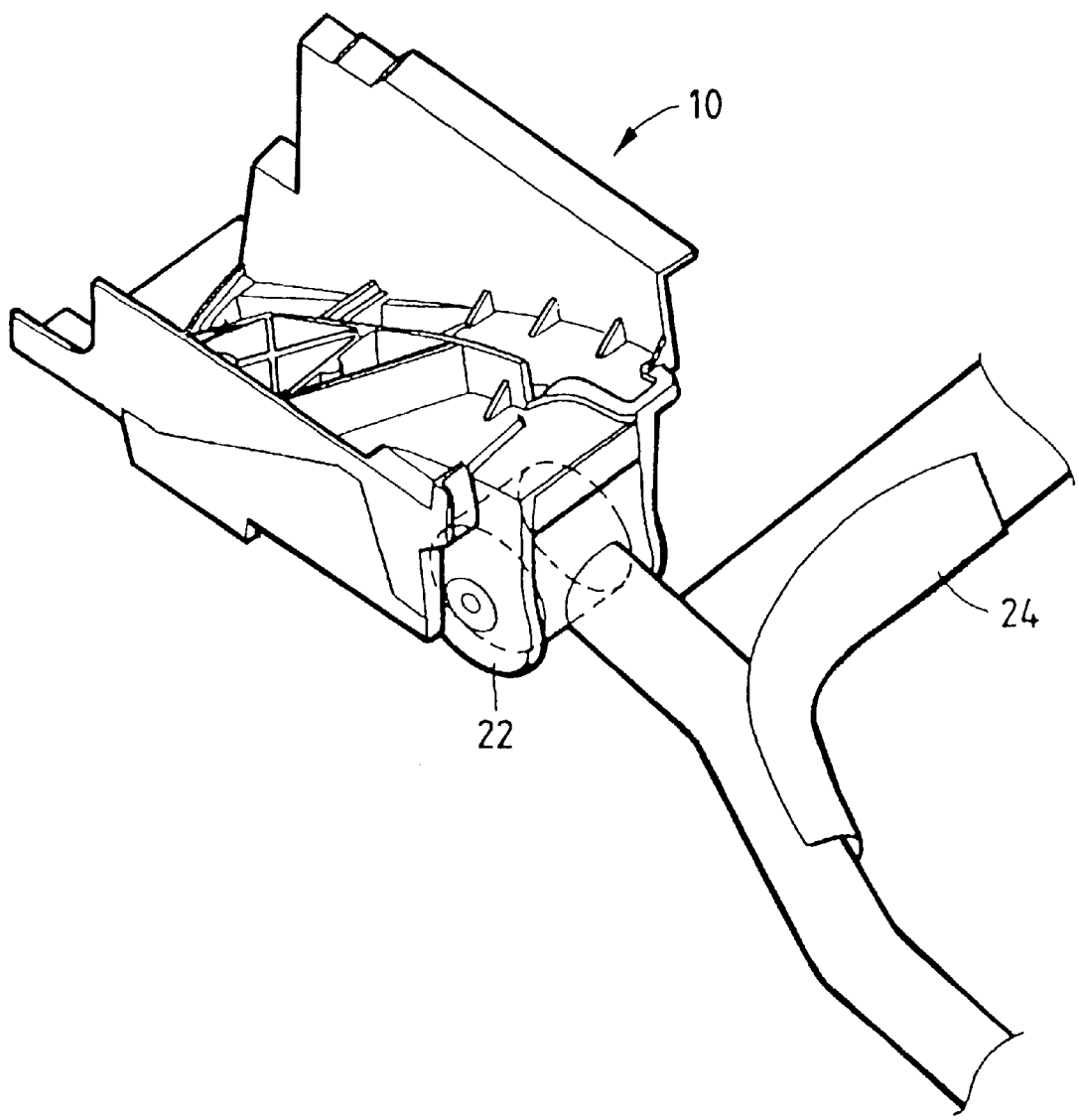
FIG. 5 shows a perspective view of the principal part, showing the fitting condition of a rear trailing arm with respect to the outrigger.

As shown in FIG. 2, the end portions of the extruded members including the rear cross member 3, the rear side frame 4, the side sill 5 and the floor beam 8 are welded to the outrigger 10 and as shown in FIG. 5, the rear trailing arm 24 is pivotally fitted to the arm bracket portion 22.

According to the above embodiment, the hollow beam formed by extrusion molding from a light metal material is used for linearly coupling the rear end of each front side frame to the side end of the rear cross member. So it becomes possible to increase the bending rigidity of the passenger room flooring without enlarging the sectional area of the side sill. Therefore, there is achieved an effect to restrain the deformation of the automobile body due to the collision load from developing into the passenger room without incurring the deterioration of comfortableness in the passenger room and boarding-alighting ease. Further, if the sectional shape of the hollow beam is formed by a quadrilateral shape of which width is smaller than its height and a rib is provided to join the inner surfaces of upper and lower walls of the hollow beam with ribs, desired rigidity can be obtained without increasing the thickness of the passenger room flooring. In addition, the rigidity of the joint between the hollow beam and the rear cross member can effectively be increased further by connecting the rear end of the hollow beam and the side end of the rear cross member to the outrigger.

Figure 6:
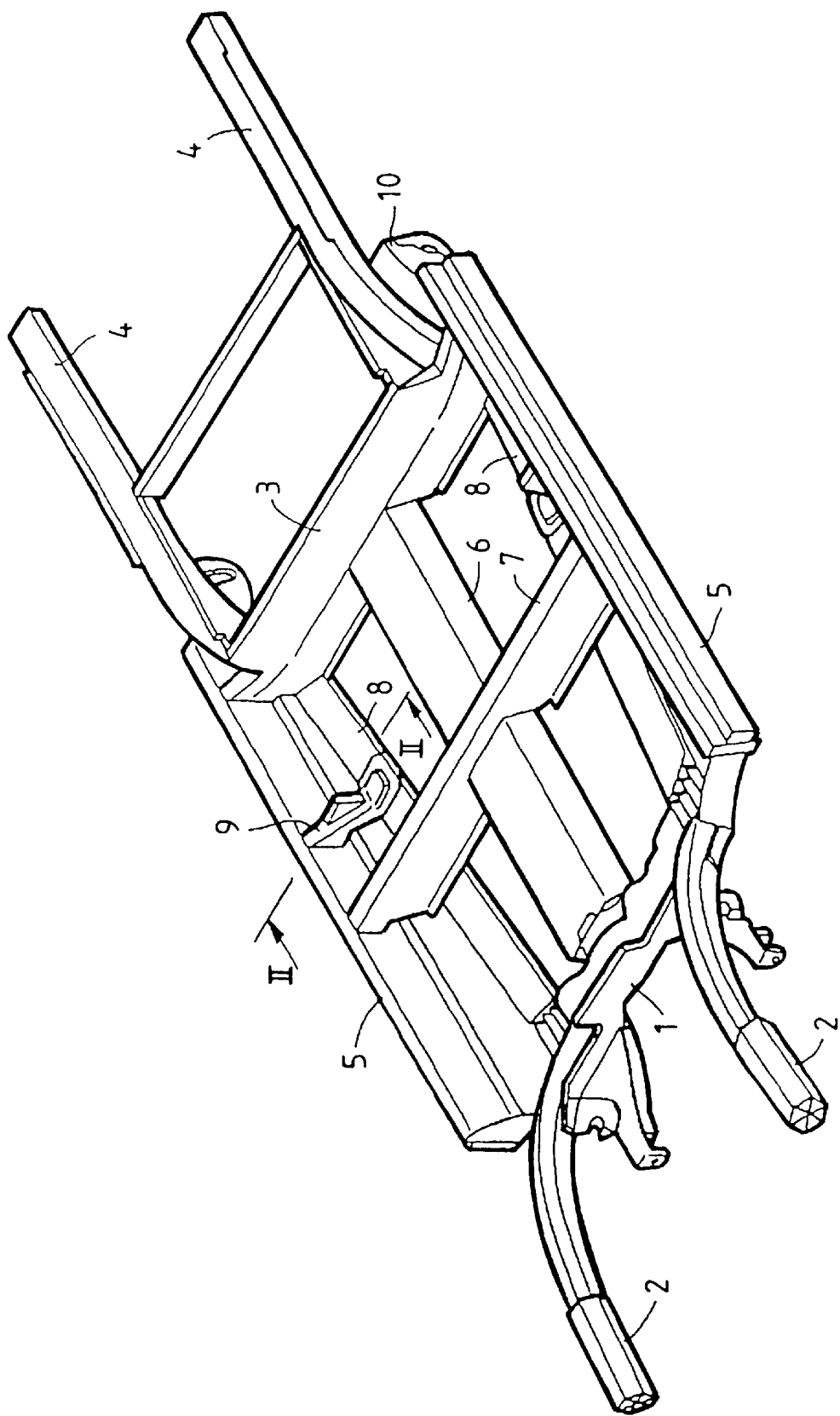
FIG. 6 shows a perspective view of a lower frame in an automobile body according to a second embodiment of the present invention.
Figure 7:
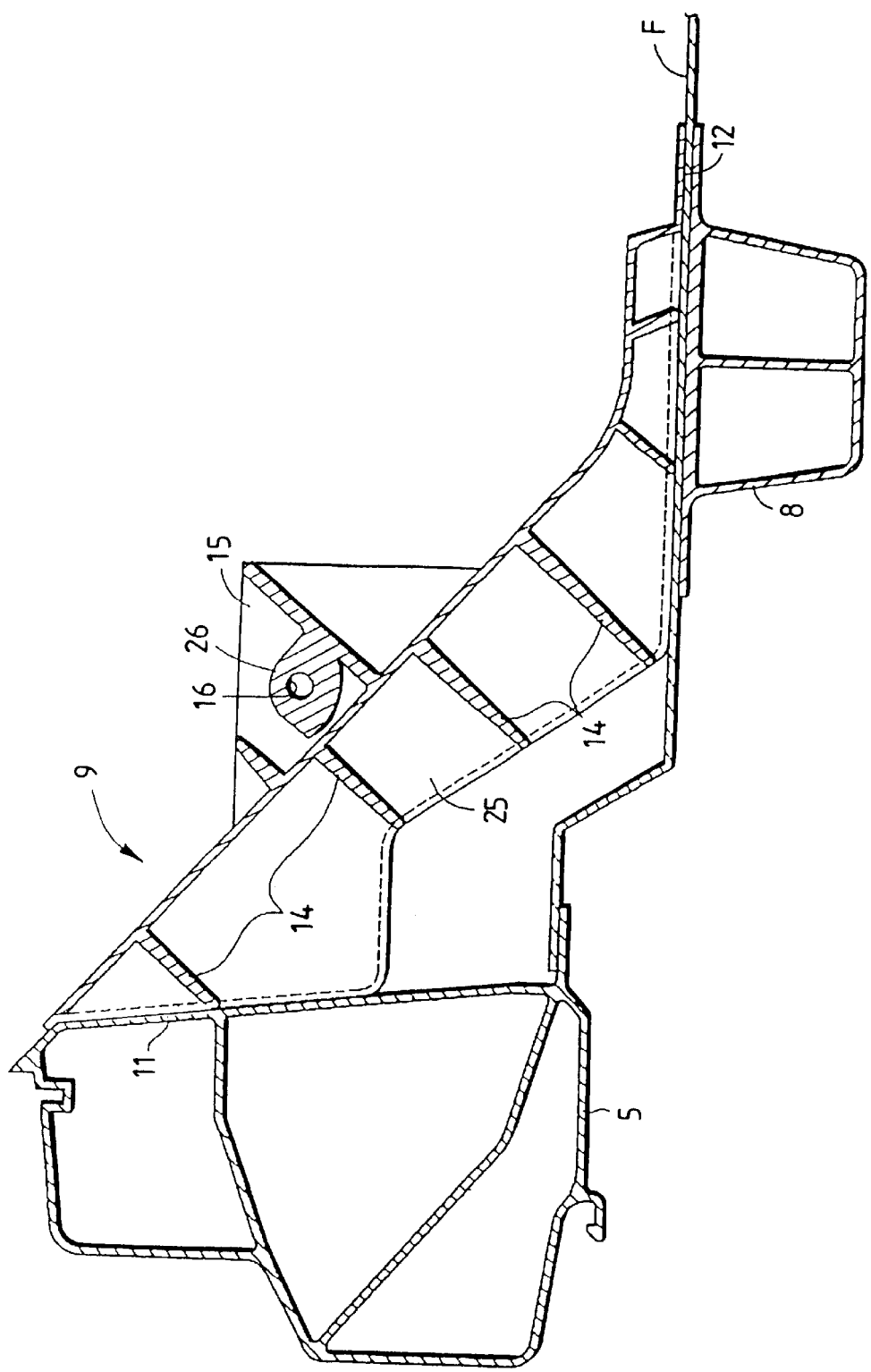
FIG. 7 shows a sectional view taken along II—II in FIG. 6.
Figure 8:
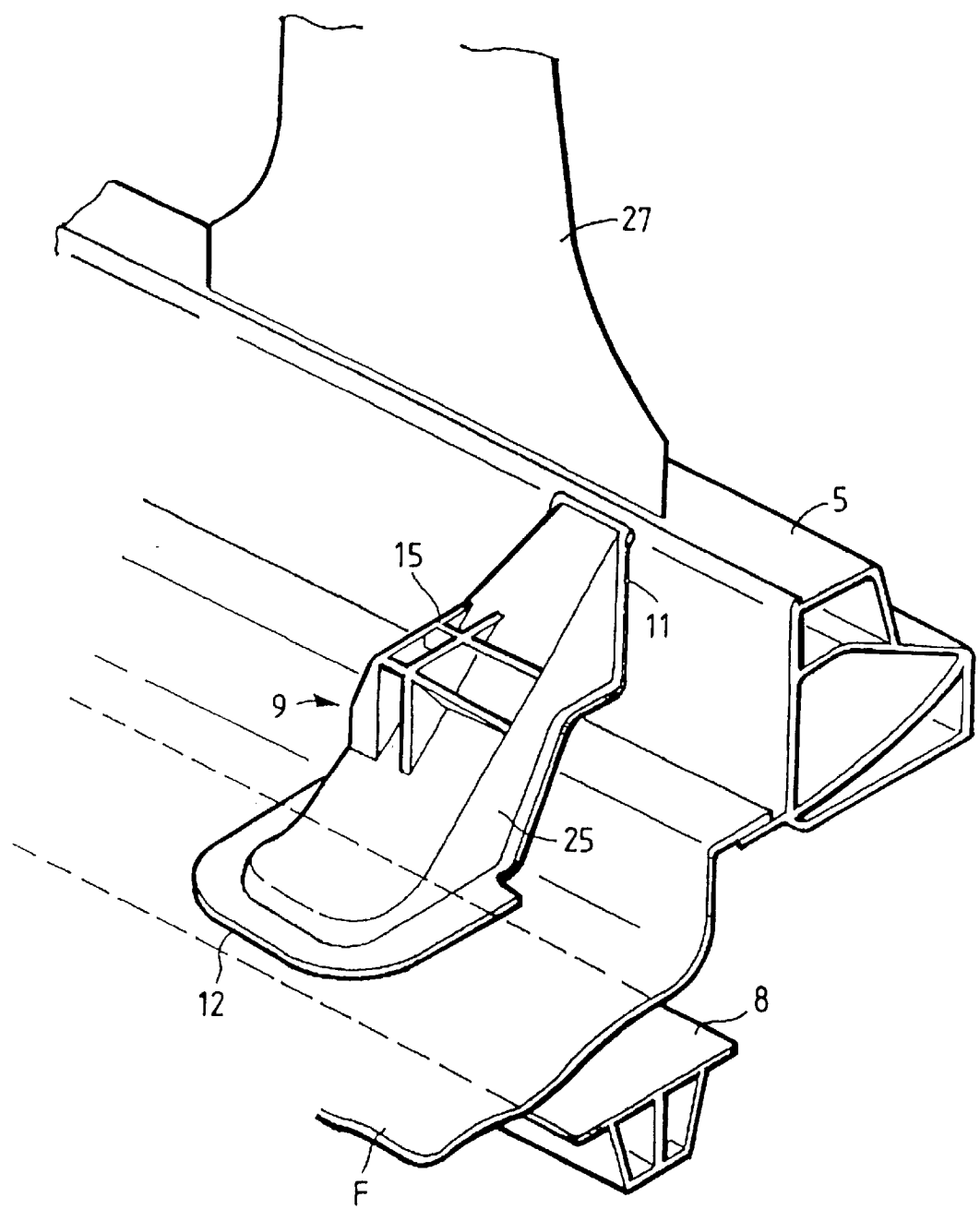
FIG. 8 shows an enlarged perspective view of a state in which a sheet rail bracket is applied in FIG. 6.

FIGS. 6 to 8 show a second embodiment of the present invention. The same parts are designated by the same numbers as in the first embodiment, and the explanation thereof will be omitted.

The sheet rail bracket 9 comprises, as shown in FIGS. 7 and 8, a vertical face 11 joined by welding, for example, to the inner side of the side sill 5 in such a way as to couple the portion between the adjoining region of the center-pillar coupling portion of the side sill 5 and the floor beam 8, a horizontal face 12 joined by welding, for example, to the surface of the flooring F spread on the floor beam 8, and a gusset portion 25 for connecting the aforesaid two faces, these component elements being integrally formed by die casting from aluminum alloy.

The gusset portion 25 is in the form of a box whose inner surface is joined with a plurality of ribs 14 so as to obtain greater rigidity and also has a mount portion 15 on its sloped surface. The mount portion 15 is used for mounting the rear end of the sheet rail and provided with a boss 26 having a female screw hole 16 into which a bolt for fixing the sheet rail is screwed.

Thus, two members (the side sill 5 and the floor beam 8) extending in the longitudinal direction are laterally coupled together via highly rigid member (the sheet rail bracket 9) in the proximity of the center pillar 27, whereby the side sill 5 and the floor beam 8 are both made to receive the load applied to the center pillar 27. Consequently, the bending rigidity of the coupling portion where the center pillar 27 and the side sill 5 are coupled together can be increased without deteriorating boarding-alighting ease as a result of using a side sill having a large sectional area and without deriving a special high-rigid member as a reinforcing material which may bring about a substantial production-cost increase.

According to the above embodiment, the bending rigidity of the coupling portion between the center pillar and the side sill can be increased without incurring a substantial increase in the size of the side sill and the production cost. So the invention has the effect of restraining the influence of the deformation of the center pillar due to a side impact on a passenger room to a great extent.

Although the invention has been described in its preferred form with a certain degree of particularity, it is understood that the present disclosure of the preferred form can be changed in the details of construction and in the combination and arrangement of parts without departing from the spirit and the scope of the Invention as hereinafter claimed.

What is claimed is:

1. An automobile body frame comprising:

a front side frame;

a rear cross member;

a hollow beam having an inverted trapezoidal shape that is formed by extrusion molding from a light metal material for coupling a rear end of said front side frame to a side end of said rear cross member; and an outrigger formed by die casting, wherein a rear end of said hollow beam and the side end of said rear cross member are connected to said outrigger.

2. An automobile body frame according to claim 1, wherein said hollow beam has a width that is larger than its height.

3. An automobile body frame according to claim 2, wherein said hollow beam has a rib joining an upper wall and a lower walls of said hollow beam.

4. An automobile body frame according to claim 1, wherein a pair of said hollow beams are provided so that a distance between said pair of hollow beams gradually expands toward a rear side of said hollow beam.

5. An automobile body frame comprising:

a side sill;

a rear cross member;

a hollow beam having an inverted trapezoidal shape that is formed by extrusion molding from a light metal material, said hollow beam coupling a rear end of a front side frame to a side end of said rear cross member on an inner side of said side sill;

a sheet rail bracket formed by die casting for coupling an adjoining region of a center-pillar coupling portion of said side sill to said hollow beam; and an outrigger formed by die casting, wherein a rear end of said hollow beam and the side end of said rear cross member are connected to said outrigger.

6. An automobile body frame according to claim 5, wherein said hollow beam has a width that is larger than its height.

7. An automobile body frame according to claim 6, wherein said hollow beam has a rib joining an upper wall and a lower walls of said hollow beam.

8. An automobile body frame according to claim 5, wherein a pair of said hollow beams are provided so that a distance between said pair of hollow beams gradually expands toward a rear side of said hollow beam.

* * * * *